(12) United States Patent
Maeda et al.

(10) Patent No.: US 10,581,555 B2
(45) Date of Patent: Mar. 3, 2020

(54) INFORMATION PROCESSING DEVICE AND BURST ERROR REPRODUCING METHOD

(71) Applicant: FUJITSU LIMITED, Kawasaki-shi, Kanagawa (JP)

(72) Inventors: Masahiro Maeda, Zama (JP); Atsushi Miki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 80 days.

(21) Appl. No.: 15/868,579

(22) Filed: Jan. 11, 2018

(65) Prior Publication Data
US 2018/0205495 A1 Jul. 19, 2018

(30) Foreign Application Priority Data

Jan. 16, 2017 (JP) ................................ 2017-005046

(51) Int. Cl.
| | | |
|---|---|---|
| H04L 1/00 | (2006.01) | |
| G06F 3/06 | (2006.01) | |
| G06F 13/42 | (2006.01) | |
| H04L 1/18 | (2006.01) | |

(52) U.S. Cl.
CPC .......... *H04L 1/0045* (2013.01); *G06F 3/0619* (2013.01); *G06F 3/0659* (2013.01); *G06F 3/0683* (2013.01); *G06F 13/42* (2013.01); *H04L 1/0036* (2013.01); *H04L 1/0052* (2013.01); *H04L 1/18* (2013.01)

(58) Field of Classification Search
None
See application file for complete search history.

(56) References Cited

U.S. PATENT DOCUMENTS

| | | | | |
|---|---|---|---|---|
| 7,334,059 | B2* | 2/2008 | Moyer ................. | G06F 13/385 710/11 |
| 9,721,630 | B2* | 8/2017 | Stott ........................ | G11C 7/02 |
| 2002/0157060 | A1* | 10/2002 | Beacken ............... | H03M 13/15 714/784 |
| 2005/0002474 | A1* | 1/2005 | Limberg ........... | H04L 25/03057 375/321 |

(Continued)

FOREIGN PATENT DOCUMENTS

| | | |
|---|---|---|
| JP | 06-068369 | 3/1994 |
| JP | 2006-171882 | 6/2006 |

OTHER PUBLICATIONS

Qiaoyan Yu and P. Ampadu, "Adaptive error control for reliable systems-on-chip," 2008 IEEE International Symposium on Circuits and Systems, Seattle, WA, 2008, pp. 832-835. (Year: 2008).*

*Primary Examiner* — Daniel F. McMahon
(74) *Attorney, Agent, or Firm* — Fujitsu Patent Center

(57) ABSTRACT

An information processing device is provided that includes a receiver to receive information from another information processing device that mutually communicates the information and a processor to process the information received by the receiver. The receiver detects occurrence of a burst error in the received information, sequentially writes the received information in a first memory, stops the writing of the information to the first memory based on detection of the burst error, shuts off transmission of the information received from the another information processing device based on a reproducing instruction, and transmits the information read from the first memory.

18 Claims, 9 Drawing Sheets

(56) References Cited

U.S. PATENT DOCUMENTS

2006/0212650 A1\* 9/2006 Hwang .............. G11B 20/1258
711/112
2013/0223254 A1\* 8/2013 Oguchi ................ H04L 47/283
370/252

\* cited by examiner

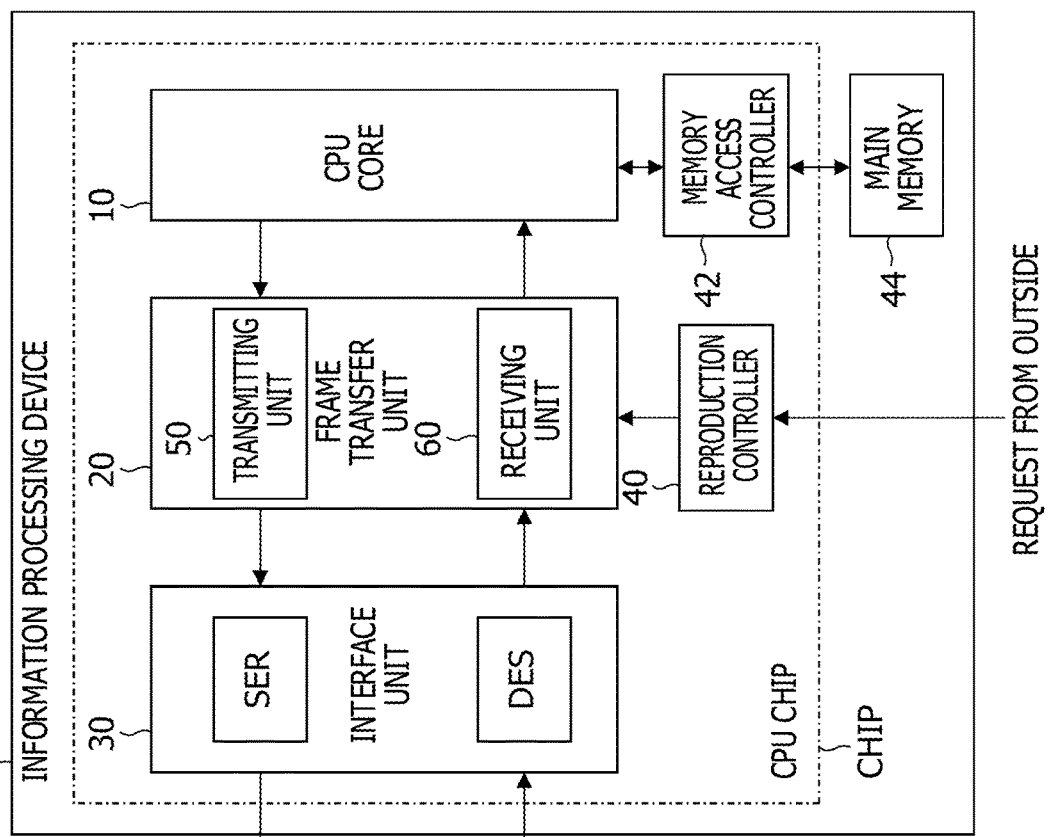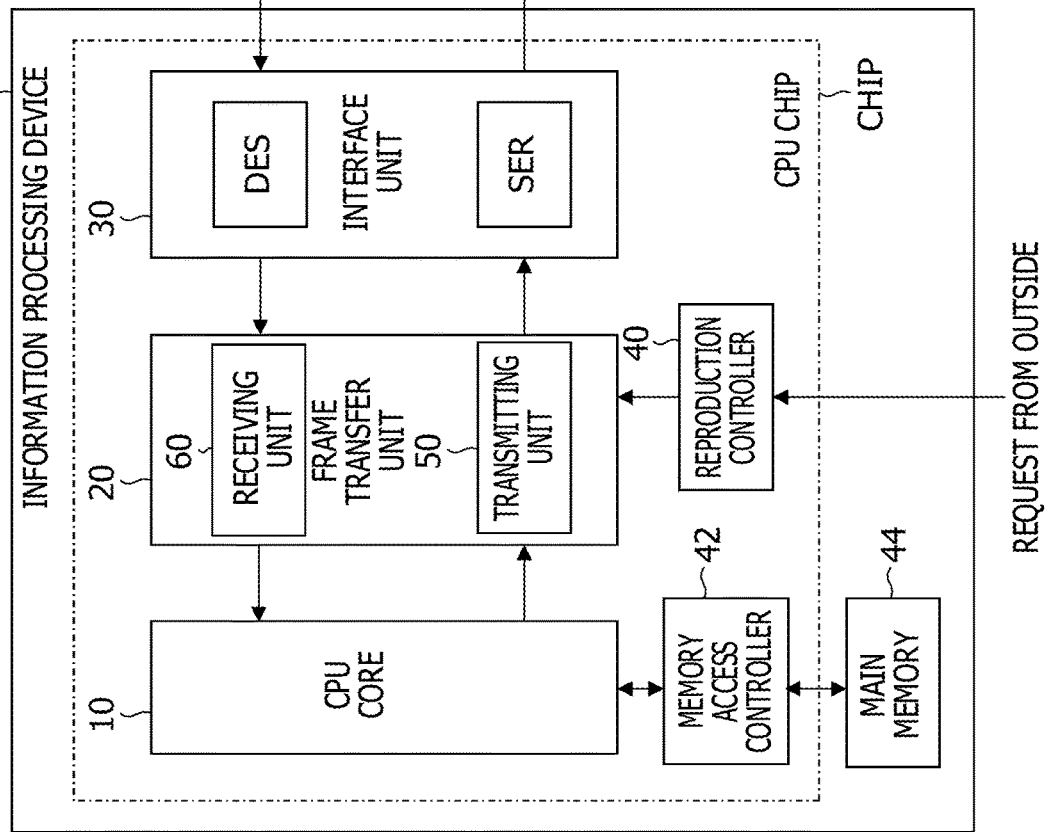
FIG. 3

INFORMATION PROCESSING DEVICE AND BURST ERROR REPRODUCING METHOD

CROSS-REFERENCE TO RELATED APPLICATION

This application is based upon and claims the benefit of priority of the prior Japanese Patent Application No. 2017-005046, filed on Jan. 16, 2017, the entire contents of which are incorporated herein by reference.

FIELD

The embodiment discussed herein is related to an information processing device and a burst error reproducing method.

BACKGROUND

In circuits transmitting and receiving data, for example, a problem in the circuit on a receiving side causes erroneous operation only when received data has a specific pattern.

A related technology is disclosed in Japanese Laid-open Patent Publication No. 2006-171882 or Japanese Laid-open Patent Publication No. 6-68369.

SUMMARY

According to an aspect of the embodiment, an information processing device includes: a receiver configured to receive information from another information processing device that mutually communicates the information; and a processor configured to process the information received by the receiver, the receiver: detects occurrence of a burst error in the received information; sequentially writes the received information in a first memory; stops the writing of the information to the first memory based on detection of the burst error; shuts off transmission of the information received from the another information processing device based on a reproducing instruction; and transmits the information read from the first memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a parallel processing device;

FIG. 7 illustrates an example of a method of detection of a burst error by firmware or the like;

DESCRIPTION OF EMBODIMENT

Figure 1:
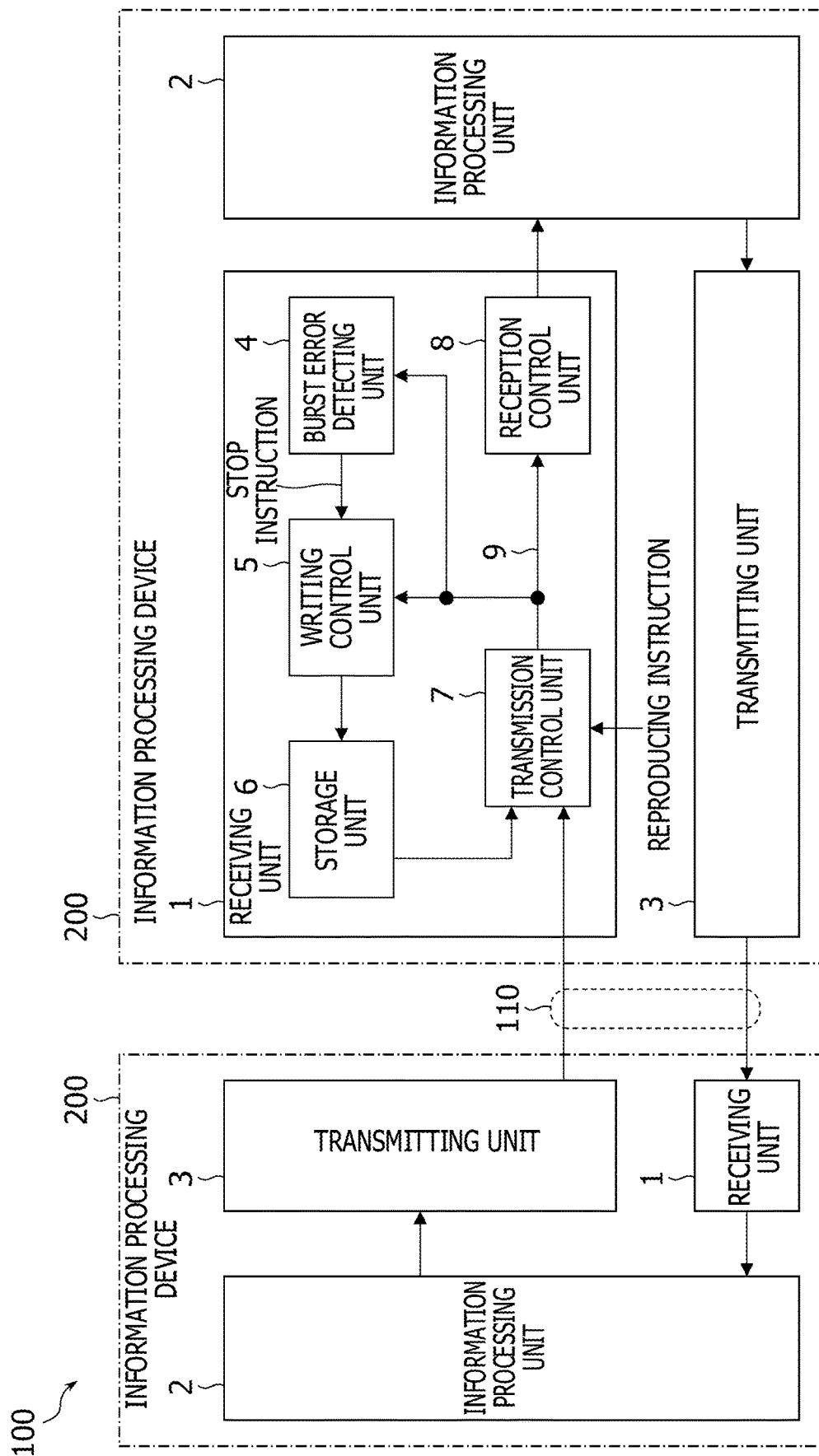
FIG. 1 illustrates an example of a parallel processing device.

In order to facilitate identifying a cause of erroneous operation, for example, a reproducing device reproduces a specific pattern causing the erroneous operation. The reproducing device stores data transmitted between circuits in a first memory. When the data includes a trigger condition, the reproducing device stops storing the data in the first memory, and stores the data stored in the first memory in a second memory. The reproducing device expands, in the first memory, the data stored in the second memory based on an instruction to reproduce the data, and supplies the circuit on a receiving side with a data pattern at a time of occurrence of the trigger condition, using the expanded data.

A monitoring system monitoring a plant stores process data from the plant in a first storing unit. At a time of detection of an abnormality, the monitoring system transfers the process data before detection of the abnormality, the process data being stored in the first storing unit, to a second storing unit. When process data from the plant after the detection of the abnormality is stored in the second storing unit, the process data before and after the detection of the abnormality is stored in the second storing unit without being erased even in a case where the plant continues to be monitored. Therefore, a state at the time of the abnormality is displayed on a display using process information stored in the second storing unit.

In a case where packets or the like are transmitted between devices via a transmission line, for example, a bit error occurs depending on the quality of the transmission line or the like. The bit error is corrected by a device receiving the packets. There is, for example, a bit error rate (BER) as an index for measuring the transmission quality of the transmission line. The bit error rate is expressed by an exponent having a base of "10." An error state in which the bit error rate steadily falls within a certain range is referred to as a random error. An error state in which the bit error rate temporarily exceeds the certain range is referred to as a burst error.

The device that receives packets in which a burst error occurs, for example, performs error processing such as a packet retransmission request in response to the occurrence of the burst error. When the level of the burst error deteriorates to such a degree that the packets are not recognized, for example, the device receiving the packets may not be able to issue a response or a retransmission request corresponding to the packets to the transmission source of the packets, and communication between the devices is shut off (link down).

When the burst error is reproduced, for example, behavior at the time of occurrence of the burst error within the device receiving the packets may be examined, and the cause of the link down may become clear. A burst error is, for example, caused by an external factor that is difficult to control, such as noise occurring in the transmission line, variations in voltage of a circuit generating a signal to be transmitted to the transmission line, or variations in ambient temperature of the circuit. It may therefore be difficult to reproduce the burst error causing the link down.

A burst error occurring in a transmission line or the like, for example, may be reproduced.

For signal lines through which signals are transmitted, same reference characters as the names of the signals are used.

FIG. 1 illustrates an example of a parallel processing device. A parallel processing device 100 illustrated in FIG. 1 includes a plurality of information processing devices 200 that mutually communicate information included in packets or the like via a transmission line 110. In FIG. 1, two information processing devices 200 are intercoupled via the transmission line 110. However, each information processing device 200 may be coupled to two or more information processing devices 200 via the transmission line 110. The parallel processing device 100 performs information processing such as calculation processing or data processing in parallel using the plurality of information processing devices 200. A path including the transmission line 110 which couples the information processing devices 200 to each other will hereinafter be referred to also as a link. Information mutually communicated between the information processing devices 200 is transmitted as packets to the transmission line 110.

Each information processing device 200 includes a receiving unit 1 configured to receive packets from the other information processing device 200, an information processing unit 2 configured to process the packets received by the receiving unit 1, and a transmitting unit 3 configured to transmit, as packets, information generated by the information processing unit 2 to the other information processing device 200.

The receiving unit 1 includes a burst error detecting unit 4, a writing control unit 5, a storage unit 6, a transmission control unit 7, and a reception control unit 8. The burst error detecting unit 4 receives packets from the other information processing device 200 via an internal transmission line 9 coupled to the output of the transmission control unit 7. When the burst error detecting unit 4 detects that a burst error has occurred in the received packets, the burst error detecting unit 4 outputs a stop instruction to the writing control unit 5.

The writing control unit 5 sequentially writes packets received from the other information processing device 200 via the internal transmission line 9 to the storage unit 6 before receiving the stop instruction. The writing control unit 5 stops writing packets to the storage unit 6 based on the received stop instruction. For example, the writing control unit 5 sequentially writes packets to the storage unit 6 until a burst error occurs, and stops writing packets to the storage unit 6 when a burst error occurs.

The storage unit 6 has a plurality of storage areas storing the packets supplied from the writing control unit 5. The storage unit 6, for example, operates as a ring buffer. After packets are written to all the storage areas, new packets supplied from the writing control unit 5 overwrite, in order, the storage areas in which the old packets are stored. The packets written to the storage unit 6 include an error at a time of occurrence of the burst error.

Based on a reproducing instruction, the transmission control unit 7 releases coupling between the transmission line 110 receiving packets from the other information processing device 200 and the internal transmission line 9, and couples a path through which packets are read from the storage unit 6 to the internal transmission line 9. For example, based on a reproducing instruction, the transmission control unit 7 shuts off transmission of packets received from the other information processing device 200 to the internal transmission line 9, and transmits packets read from the storage unit 6 to the internal transmission line 9. The reproducing instruction is, for example, generated by a control chip or the like included in the information processing device 200 based on an instruction from a managing device managing the parallel processing device 100. The reproducing instruction may be generated by the information processing unit 2.

The reception control unit 8 checks packets received from the transmission control unit 7 via the internal transmission line 9. When the packets do not include an error, the reception control unit 8 outputs the received packets to the information processing unit 2. When the packets include an error, for example, the information processing device 200 transmits a retransmission request to retransmit the packets from the transmitting unit 3 to the information processing device 200 as an issuance source of the packets.

When the bit error rate becomes so high that recognition of packets by the reception control unit 8 becomes difficult (burst error), a retransmission request or the like is not issued, and the link goes down. For example, when the information processing device 200 that has issued a packet does not receive a response (including a retransmission request) corresponding to the issued packet for one second or more, the information processing device 200 performs processing of bringing down the link through which the packet is transmitted (link down).

As described above, after the occurrence of the burst error, the transmission control unit 7 performs switching that shuts off the path from the other information processing device 200 to the reception control unit 8 and couples the path from the storage unit 6 to the reception control unit 8 based on a reproducing instruction. Packets including errors at the time of occurrence of the burst error are thereafter output from the storage unit 6 to the reception control unit 8 via the transmission control unit 7. The packets stored in the storage unit 6 include the error occurring in the transmission line 110 or the like. The storage unit 6 stores data included in the packets, and besides stores the whole of the packets including a header part and the like.

Thus, the receiving unit 1 may faithfully reproduce the packets including the errors at the time of occurrence of the burst error without making the packets being transmitted from the other information processing device 200 again. Based on the reproduced packets, the operation of the reception control unit 8 or a communication control unit or the like is verified, for example, and the cause of the link down is identified, for example. The packets including the errors at the time of occurrence of the burst error are stored in the storage unit 6 without being overwritten by the writing control unit 5 due to a stop instruction output by the burst error detecting unit 4. Therefore, the packets including the errors at the time of occurrence of the burst error are reproduced any number of times by reading the packets from the storage unit 6, and the operation of the reception control unit 8 or the communication control unit is verified repeatedly.

Figure 2:
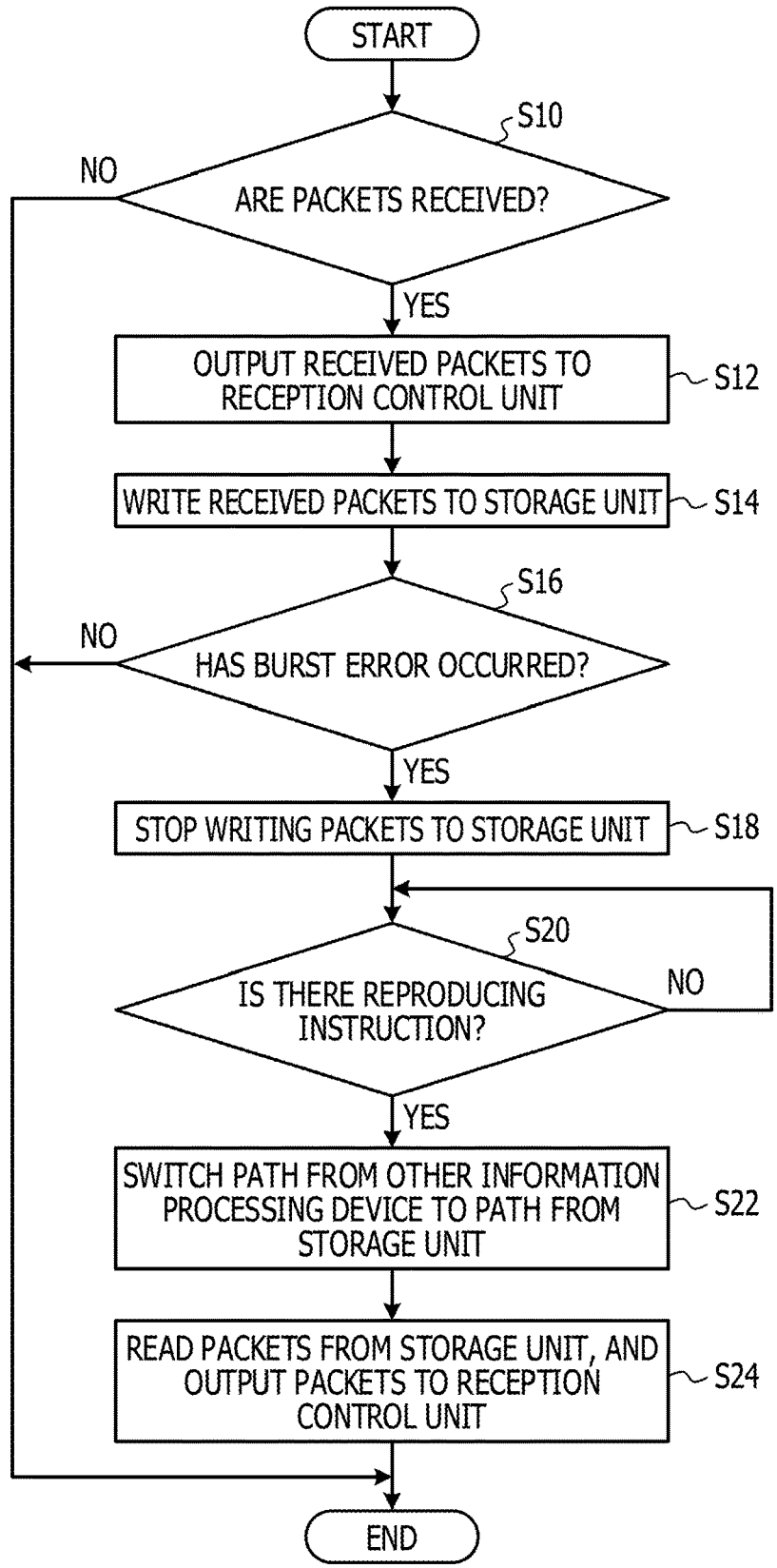
FIG. 2 illustrates an example of operation of a receiving unit illustrated in FIG. 1.

FIG. 2 illustrates an example of operation of the receiving unit illustrated in FIG. 1. As an example, FIG. 2 illustrates an example of a burst error reproducing method that reproduces a burst error. A flow illustrated in FIG. 2 is performed in a given cycle.

When the receiving unit 1 receives packets from the other information processing device 200 in operation S10, the processing is shifted to operation S12. When no packets are received from the other information processing device 200, the processing is ended. In an initial state, the transmission control unit 7 is switched to the path through which the transmission control unit 7 outputs the packets from the other information processing device 200 to the internal transmission line 9. In operation S12, the transmission control unit 7 outputs the received packets to the reception control unit 8.

In operation S14, the writing control unit 5 writes the packets received via the internal transmission line 9 to the storage unit 6. Operations S12 and S14 may be performed in reverse order, or may be performed in parallel with each other. In operation S16, the burst error detecting unit 4 detects whether or not a burst error has occurred. When no burst error has occurred, the processing is ended. When a burst error has occurred, the processing is shifted to operation S18.

In operation S18, the burst error detecting unit 4 outputs a stop instruction to stop writing packets to the storage unit 6 to the writing control unit 5 based on the detection of the burst error. The writing control unit 5 stops writing packets to the storage unit 6 based on the stop instruction. Because the writing of packets is stopped, the storage unit 6 retains the packets including information in which the burst error has occurred without the packets being lost by overwriting or the like.

In operation S20, the transmission control unit 7 waits to receive a reproducing instruction. When the transmission control unit 7 receives a reproducing instruction, the processing is shifted to operation S22. In operation S22, based on the reproducing instruction, the transmission control unit 7 shuts off the path through which the transmission control unit 7 outputs the packets received from the other information processing device 200 to the internal transmission line 9, and couples, to the internal transmission line 9, the path of the packets read from the storage unit 6. In operation S24, the transmission control unit 7 reads the packets from the storage unit 6, outputs the read packets to the internal transmission line 9, and ends the processing.

In FIG. 1 and FIG. 2, the receiving unit 1 reproduces the packets including the errors at the time of occurrence of the burst error in the transmission line 110 or the like without making the packets being transmitted from the other information processing device 200 again. The operation of an internal circuit such as the reception control unit 8 is verified based on the reproduced packets. The cause of a problem such as the link down or the like caused by the burst error is thereby identified.

The packets including the errors at the time of occurrence of the burst error are stored in the storage unit 6 without being overwritten by the writing control unit 5. Therefore, the packets received from the other information processing device 200 are reproduced any number of times. The storage unit 6 stores data included in the packets, and besides stores the whole of the packets including a header part or the like. The packets including the errors at the time of occurrence of the burst error are therefore reproduced faithfully.

FIG. 3 illustrates an example of a parallel processing device. A parallel processing device 102 illustrated in FIG. 3 includes a plurality of information processing devices 202 that mutually communicate information included in packets or the like via a transmission line 112. In FIG. 3, two information processing devices 202 are intercoupled via the transmission line 112. However, each information processing device 202 may be coupled to a plurality of information processing devices 202 via the transmission line 112. A path including the transmission line 112 which couples the information processing devices 202 to each other will hereinafter be referred to also as a link. The parallel processing device 102 performs information processing such as calculation processing or data processing in parallel using the plurality of information processing devices 202.

Each information processing device 202 includes a central processing unit (CPU) chip CHIP and a main memory 44. In the following, the CPU chip CHIP will be referred to also as CHIP. Each information processing device 202 includes a storage device such as a hard disk drive (HDD) or a solid state drive (SSD), and a power supply device, which are not illustrated. The main memory 44 includes a memory module such as a hybrid memory cube (HMC) or a dual inline memory module (DIMM).

CHIP includes a CPU core 10, a frame transfer unit 20, an interface unit 30, a reproduction controller 40, and a memory access controller 42. CHIP may include a plurality of CPU cores 10. The CPU core 10 performs processing based on information received from the other information processing device 202, and transmits a result of performing the processing to the other information processing device 202. Alternatively, the CPU core 10 generates information to be processed by the other information processing device 202, transmits the information to the other information processing device 202, and receives a result of performing the processing from the other information processing device 202. The CPU core 10 may be an example of an information processing unit.

Figure 4:
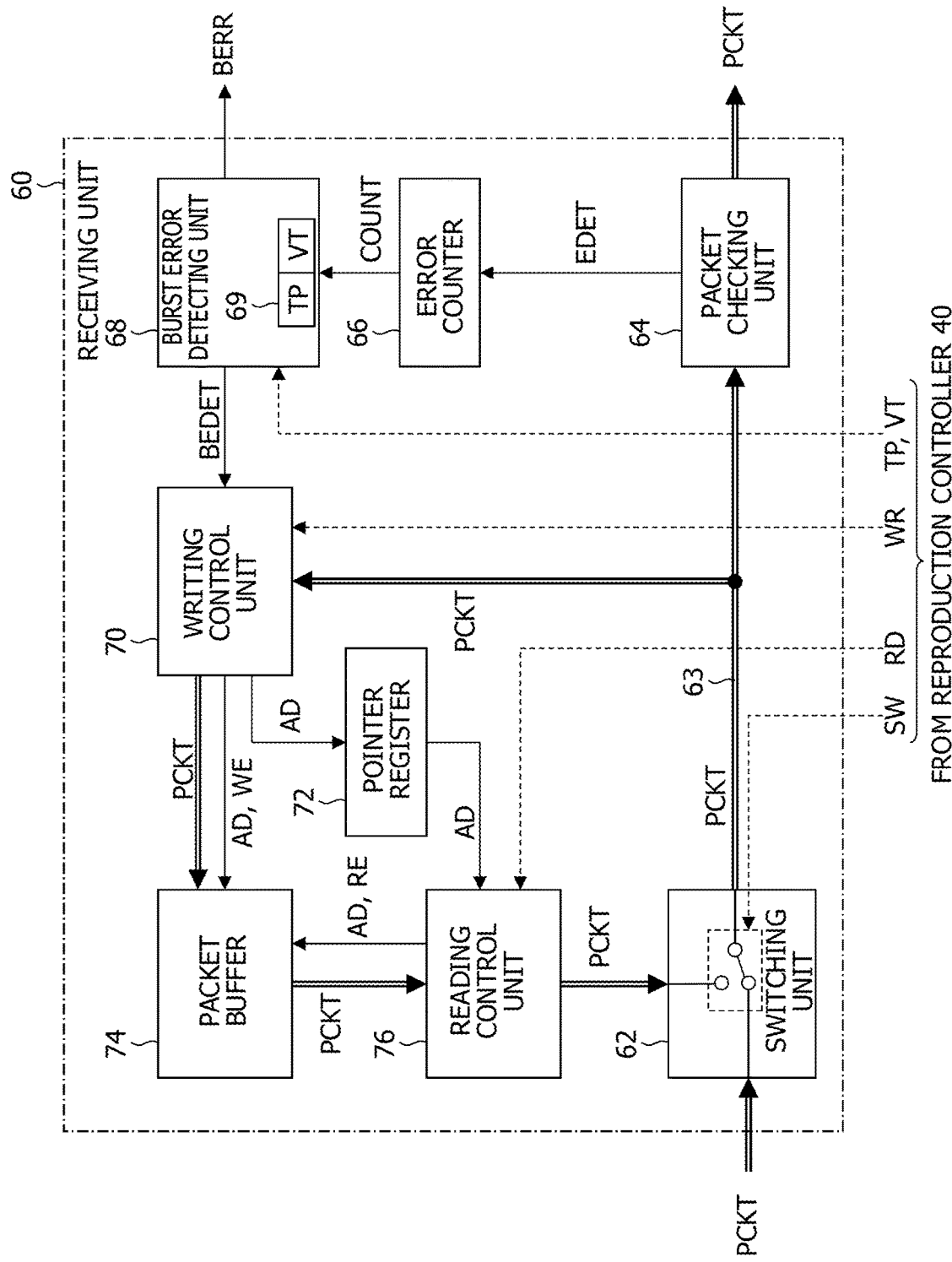
FIG. 4 illustrates an example of a receiving unit illustrated in FIG. 3.

The frame transfer unit 20 includes a transmitting unit 50 and a receiving unit 60. The transmitting unit 50 transmits packets including information output from the CPU core 10 to the other information processing device 202 via the interface unit 30 and the transmission line 112. The receiving unit 60 receives packets from the other information processing device 202 via the transmission line 112 and the interface unit 30, and outputs the received packets to the CPU core 10. The receiving unit 60 performs operation of reproducing a burst error based on an instruction from the reproduction controller 40. An example of the receiving unit 60 is illustrated in FIG. 4. The frame transfer unit 20 includes a frame generating unit configured to generate the frames of packets to be transmitted by the transmitting unit 50, a reception buffer configured to retain the packets that are received by the receiving unit 60 and whose error is corrected, a link control unit configured to control the link, and the like.

The interface unit 30 includes a DES (DESerializer) and a SER (SERializer). The DES converts a serial signal received via the transmission line 112 into a parallel signal, and outputs the converted parallel signal to the frame transfer unit 20. The SER converts a parallel signal received from the frame transfer unit 20 into a serial signal, and transmits the converted serial signal to the transmission line 112. The transmission line 112, for example, includes a plurality of lanes transmitting respective serial signals on a receiving side and a transmitting side.

As will be described later, the reproduction controller 40 performs control that makes the receiving unit 60 reproduce a burst error based on a request from the outside. For example, a system administrator managing the parallel processing device 102 operates a managing device managing the parallel processing device 102, and thereby the managing device issues the request from the outside. The request from the outside may be supplied to the reproduction controller 40 via the CPU core 10. Alternatively, functions of the reproduction controller 40 may be implemented by a control program executed by the CPU core 10.

The memory access controller 42 accesses the main memory 44 based on a memory access request (a read request or a write request) output by the CPU core 10.

FIG. 4 illustrates an example of the receiving unit illustrated in FIG. 3. In FIG. 4, double line arrows indicate paths of transmission of packets PCKT. Solid line arrows indicate control signals generated by the receiving unit. Broken line arrows indicate control signals generated by the reproduction controller 40.

The receiving unit 60 includes a switching unit 62, a packet checking unit 64, an error counter 66, a burst error detecting unit 68, a writing control unit 70, a pointer register 72, a packet buffer 74, and a reading control unit 76. The input of the packet checking unit 64 and the input of the writing control unit 70 are coupled to the output of the switching unit 62 via an internal transmission line 63. The switching unit 62 and the reading control unit 76 may be an example of a transmission control unit. The packet buffer 74 may be an example of a storage unit.

When the switching unit 62 receives a control signal SW representing a switching instruction from the reproduction controller 40, the switching unit 62 shuts off coupling between the path of transmission of the packets PCKT from the other information processing device 202 and the internal transmission line 63. The switching unit 62 couples, to the internal transmission line 63, the path of transmission of the packets PCKT output from the reading control unit 76. The switching signal SW may be an example of a second reproducing instruction.

When the switching unit 62 receives a control signal SW representing a return instruction from the reproduction controller 40, on the other hand, the switching unit 62 shuts off the coupling between the path of transmission of the packets PCKT output from the reading control unit 76 and the internal transmission line 63. The switching unit 62 couples, to the internal transmission line 63, the path of transmission of the packets PCKT from the other information processing device 202. In the following, the control signal SW representing the switching instruction will be referred to as a switching signal SW, and the control signal SW representing the return instruction will be referred to as a return signal SW.

The packet checking unit 64 checks information such as data included in the packets PCKT received from the switching unit 62 via the internal transmission line 63, and outputs an error detection signal EDET each time the packet checking unit 64 detects an error. The error detection signal EDET may be an example of error detection information. When the packets PCKT do not include an error, the packet checking unit 64 outputs the packets PCKT to the CPU core 10 via a buffer unit or the like provided within the frame transfer unit 20. The packet checking unit 64 may be an example of a checking unit. The error detection signal EDET may be an example of error detection information. As will be described with reference to FIG. 5, when the packets PCKT are transferred to the other information processing device 202 via the information processing device 202, the packets PCKT are transferred to the other information processing device 202 without being output to the CPU core 10.

The error counter 66 counts the number of error detection signals EDET output from the packet checking unit 64, and outputs a counter value COUNT obtained by the counting. The counter value COUNT, for example, indicates a total number of errors detected by the packet checking unit 64. The error counter 66 may be an example of a counter unit.

The burst error detecting unit 68 includes a register 69 that rewritably retains a time interval TP and a threshold value VT. The time interval TP and the threshold value VT retained in the register 69 are rewritten by the reproduction controller 40. The register may be an example of a retaining unit. With the time interval TP and the threshold value VT made rewritable, burst error detection sensitivity is set optimally according to an environment in which the parallel processing device 102 is installed.

When the burst error detecting unit 68 detects a burst error based on the time interval TP and the threshold value VT retained in the register 69, the burst error detecting unit 68 outputs a burst error detection signal BEDET to the writing control unit 70. When the burst error detecting unit 68 detects the burst error, the burst error detecting unit 68 outputs a burst error signal BERR for notifying the occurrence of the burst error to an error processing unit or the like provided within the frame transfer unit 20. The burst error signal BERR may be output to the CPU core 10. An example of a burst error detecting method will be described with reference to FIG. 6.

The writing control unit 70 sequentially writes the packets PCKT received via the internal transmission line 63 to the packet buffer 74 until the writing control unit 70 receives the burst error detection signal BEDET after receiving a release signal WR representing a release instruction. For example, the writing control unit 70 writes the packets PCKT received from the other information processing device 202 to the packet buffer 74. The writing control unit 70 stops writing the packets PCKT to the packet buffer 74 by stopping generating a writing control signal WCNT based on the reception of the burst error detection signal BEDET. When the writing of the packets PCKT to the packet buffer 74 is stopped based on the detection of the burst error, the circuit scale of the packet buffer 74 is decreased as compared with a case where the packets PCKT received before and after the detection of the burst error are written.

For example, the writing control unit 70 specifies, by an address signal AD, the position of a storage area within the packet buffer 74 in which to write a packet PCKT, and writes the packet PCKT to the packet buffer 74 in synchronism with a write enable signal WE. When the size of the packet PCKT is larger than a storage area assigned to one address AD of the packet buffer 74, the writing control unit 70 divides the packet PCKT into a plurality of separate parts, and writes the plurality of separate parts to the packet buffer 74.

The packet buffer 74 operates as a ring buffer that has a plurality of storage areas to which addresses AD are allocated, and which stores information cyclically. The packet buffer 74 has a storage capacity capable of storing packets PCKT received within a maximum time interval TP that may be set in the register 69. Therefore, even in the case where the packet buffer 74 is made to operate as a ring buffer, the packets PCKT received during the time interval TP during which a burst error is detected are retained in the packet buffer 74 without the packets PCKT being lost. The packet buffer 74 stores data included in the packets PCKT, and besides stores the whole of the packets PCKT including a header part and the like. Thus, as with the receiving unit 1 illustrated in FIG. 1, the receiving unit 60 faithfully reproduces the packets PCKT including errors at the time of occurrence of the burst error without making the packets PCKT transmitted from the other information processing device 202 again.

The writing control unit 70, for example, writes the packets PCKT to the storage areas of the packet buffer 74 in increasing order of the addresses AD. The writing control unit 70 writes an address AD (for example, a first address AD) at which a packet PCKT has been first written as a pointer value to the pointer register 72. After the writing control unit 70 writes the packets PCKT to all of the storage areas of the packet buffer 74, the writing control unit 70 overwrites the storage areas to which the packets PCKT have been already written with newly received packets PCKT in increasing order of the addresses AD. In this case, the writing control unit 70 writes the head address AD of a storage area storing an oldest packet PCKT, the storage area being on the side of a larger address AD than the overwritten storage areas, as a pointer value to the pointer register 72.

Thus, the pointer value (address AD) retained by the pointer register 72 indicates the head of the oldest packet PCKT stored in the packet buffer 74. For example, the pointer value indicates the packet PCKT received earliest by the receiving unit 60 among the packets PCKT stored in the packet buffer 74. The pointer register 72 may be an example of a positional information retaining unit. The addresses AD written to the pointer register 72 may be an example of positional information.

The writing control unit 70 releases a stopped state of writing of the packets PCKT to the packet buffer 74 based on reception of a release signal WR representing a release instruction from the reproduction controller 40. The writing control unit 70 sequentially writes the packets PCKT received via the internal transmission line 63 to the packet buffer 74 until the writing control unit 70 receives the burst error detection signal BEDET after releasing the stopped state. At this time, the writing control unit 70, for example, writes the received packets PCKT in order from the head address AD of the packet buffer 74.

The writing control unit 70 writes the address AD to the pointer register 72, and the reading control unit 76 reads the address AD retained in the pointer register 72. The reading control unit 76 reads the address AD retained in the pointer register 72 based on reception of a reading signal RD representing a reading instruction from the reproduction controller 40. The reading signal RD may be an example of a first reproducing instruction.

The reading control unit 76 repeats an operation of outputting the address AD and a read enable signal RE to the packet buffer 74 while updating the address AD read from the pointer register 72 in order. The reading control unit 76 reads the packets PCKT stored in the packet buffer 74 in chronological order, and outputs the read packets PCKT to the internal transmission line 63 via the switching unit 62.

The address AD written to the pointer register 72 by the writing control unit 70 indicates the storage position of the oldest packet PCKT among the packets PCKT to be read. Therefore, by accessing the packet buffer 74 based on the address AD read from the pointer register 72, the reading control unit 76 reads and outputs the packets PCKT in the same order as the packets PCKT transmitted by the other information processing device 202. For example, the packets PCKT transmitted by the other information processing device 202 are reproduced.

The transmission rate of the packets PCKT output from the reading control unit 76 to the switching unit 62 is, for example, substantially equal to the transmission rate of the packets PCKT received by the switching unit 62 from the other information processing device 202. Therefore, the packets PCKT stored in the packet buffer 74 are transmitted to the packet checking unit 64 in substantially the same timings as the packets PCKT received from the other information processing device 202. For example, the packets PCKT including the errors at the time of occurrence of the burst error are reproduced without the packets PCKT being transmitted from the other information processing device 202.

The transmission speed of the packets PCKT read from the packet buffer 74 may be different from the transmission speed of the packets PCKT received from the other information processing device 202. In this case, a temporary buffer that temporarily retains the packets PCKT is provided within the reading control unit 76. The transmission speed of the packets PCKT read from the temporary buffer may be made to coincide with the transmission speed of the packets PCKT received from the other information processing device 202. The writing and reading of the packets PCKT to and from the packet buffer 74 may be controlled by using a write pointer and a read pointer.

Figure 5:
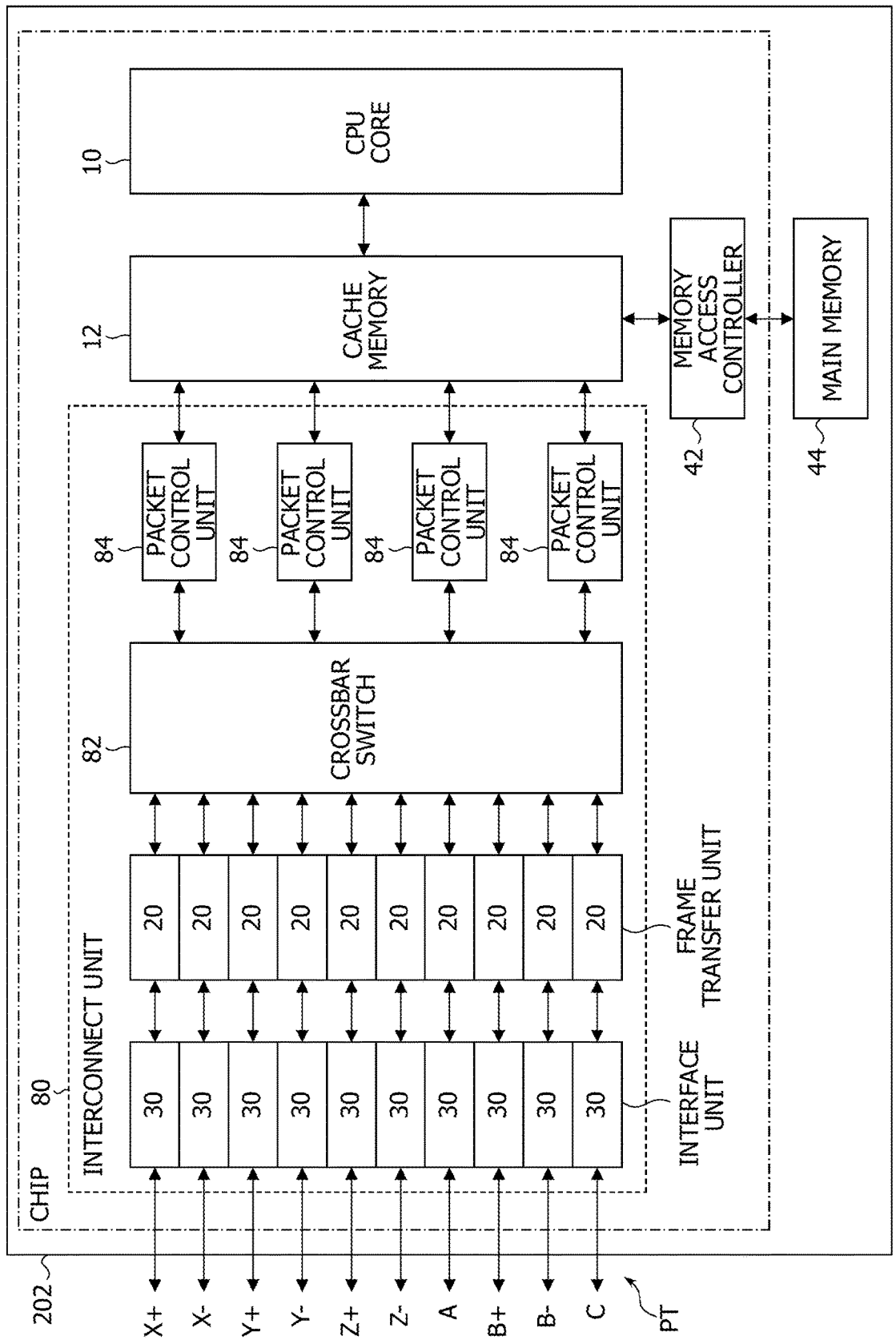
FIG. 5 illustrates an example of an information processing device illustrated in FIG. 3.

FIG. 5 illustrates an example of the information processing device 202 illustrated in FIG. 3. Detailed description of configurations similar to those of FIG. 3 may be omitted. In FIG. 5, the information processing device 202 includes an interconnect unit 80 for coupling to a six-dimensional mesh/torus network having an X-axis (X+ and X−), a Y-axis (Y+ and Y−), a Z-axis (Z+ and Z−), an A-axis, a B-axis (B+ and B−), and a C-axis. The interconnect unit 80 therefore includes 10 interface units 30 and 10 frame transfer units 20 corresponding to 10 coupling ports PT. The interconnect unit 80 includes a crossbar switch 82 that couples the 10 coupling ports PT to one another and four packet control units 84 coupled to the crossbar switch 82. The CPU core 10 is coupled to the packet control units 84 and the memory access controller 42 via a cache memory 12 (for example, a secondary cache). The information processing device 202 is referred to also as a node.

Each of the packet control units 84 receives information such as data output from the CPU core 10, and generates packets PCKT including the received information. Each packet control unit 84 transmits the generated packets PCKT to the other information processing device 202 via the crossbar switch 82, the frame transfer units 20, and the interface units 30. Each packet control unit 84 extracts information such as data from packets PCKT received from the other information processing device 202 via the interface units 30, the frame transfer units 20, and the crossbar switch 82, and outputs the extracted information to the CPU core 10. In a case where the information processing device 202 functions as a relay node for the packets PCKT, the packets PCKT received by the coupling ports PT are not input to the packet control units 84. In this case, the packets PCKT are transmitted from a coupling port PT corresponding to a node as a transmission destination of the packets PCKT via the crossbar switch 82.

Figure 6:
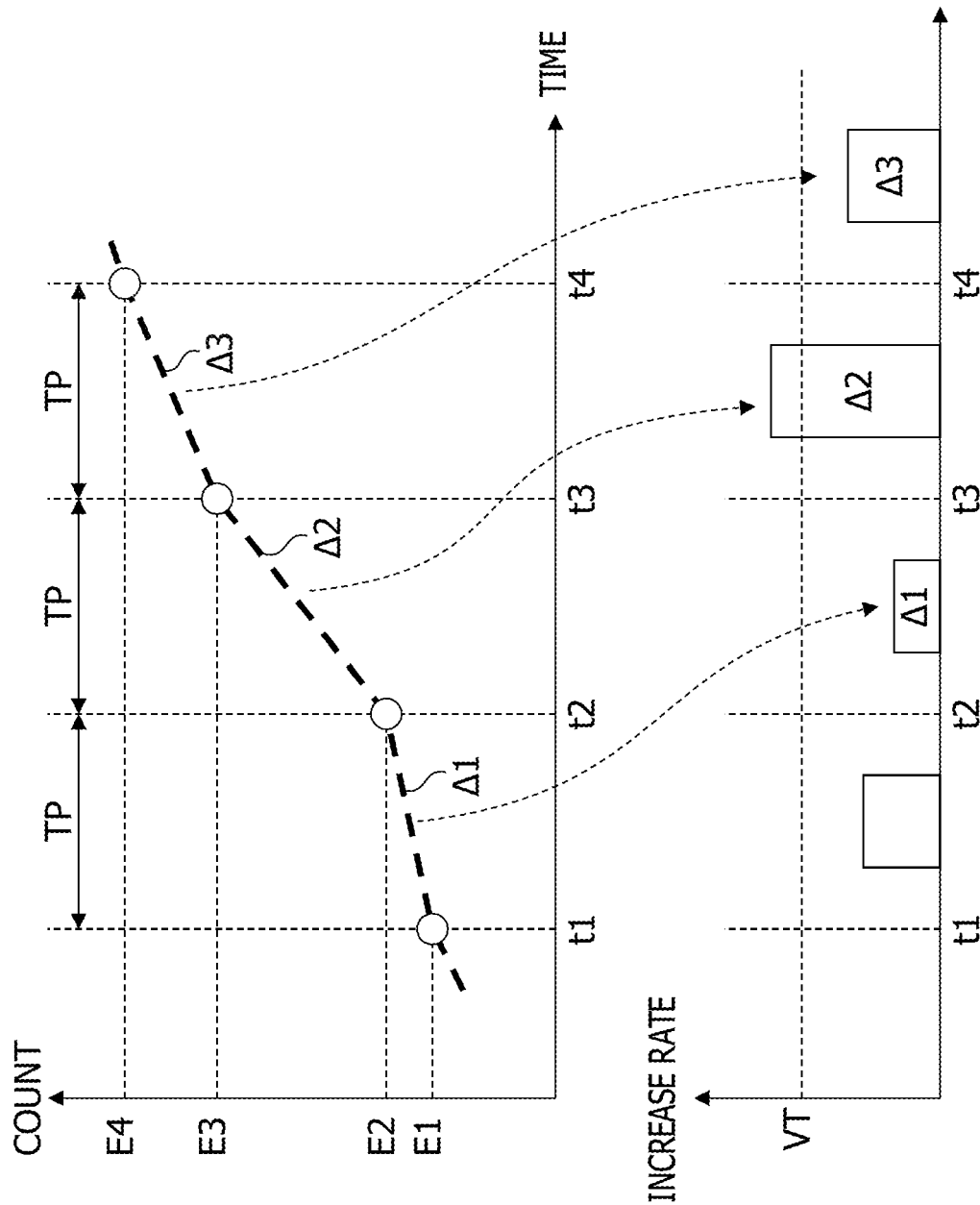
FIG. 6 illustrates an example of a method of detection of a burst error by a burst error detecting unit illustrated in FIG. 4.

FIG. 6 illustrates an example of a method of detection of a burst error by the burst error detecting unit illustrated in FIG. 4. The burst error detecting unit 68 reads the counter value COUNT (number of errors) from the error counter 66 at the time interval TP retained in the register 69. In FIG. 6, the counter value COUNT tends to increase with the passage of time. The time interval TP may be an example of a first time interval.

Increase rates of the counter value COUNT during respective time intervals TP are $\Delta 1$ between times t1 and t2, $\Delta 2$ between times t2 and t3, and $\Delta 3$ between times t3 and t4. The burst error detecting unit 68 calculates the increase rate of the number of errors by dividing an amount of change in the counter value COUNT by time. For example, the increase rate $\Delta 1$ is obtained by "(E2−E1)/(t2−t1)." As an example, the time intervals TP are not changed during burst error detecting operation. Hence, the increase rate of the number of errors is calculated as a difference in the counter value COUNT. Therefore, the circuit scale of the burst error detecting unit 68 may be decreased as compared with a case where the increase rate is calculated by division.

When only the increase rate (Δ2 in FIG. 6) at the center of the three consecutive time intervals TP exceeds the threshold value VT, the burst error detecting unit 68 detects a burst error, and outputs the burst error detection signal BEDET illustrated in FIG. 4. The threshold value VT may be an example of a first threshold value. The burst error detecting unit 68 may detect a burst error when the increase rate of the counter value COUNT exceeds the threshold value VT in one of the time intervals TP. Although each increase rate appears to be calculated around the center of each time interval TP in a graph on the lower side of FIG. 6, each increase rate is calculated immediately after the counter value COUNT is read.

Figure 7:
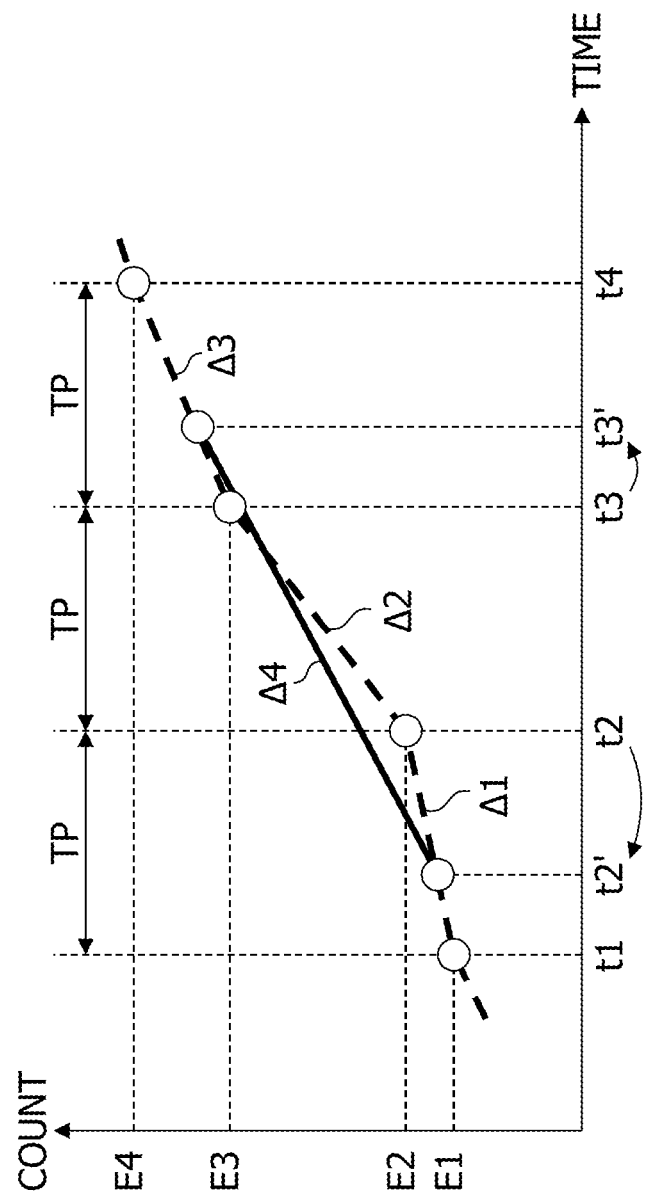

FIG. 7 illustrates an example of a method of detection of a burst error by firmware or the like. FIG. 7, for example, illustrates an example of a burst error detecting method in a case where the information processing device 202 does not have the error counter 66 nor the burst error detecting unit 68 illustrated in FIG. 4. Software such as the firmware is executed by the CPU core 10. Detailed description of the same elements as in FIG. 6 may be omitted.

The software detects a burst error by reading a register storing the number of error occurrences which number corresponds to the counter value COUNT. In the case where the software reads the register, the number of error occurrences is not read at exact time intervals TP due to a delay in access to the register. When times t2 and t3 at which the counter value COUNT is read are shifted to times t2' and t3', respectively, for example, an increase rate Δ4 of the number of error occurrences is lower than the actual increase rate Δ2 during the time interval TP illustrated in the center of FIG. 7. When the increase rate Δ4 is lower than the threshold value VT illustrated in FIG. 6, the software overlooks the occurrence of the burst error although the burst error has occurred.

Suppose, for example, that the software may read the number of error occurrences from the register at exact times t1 to t4, and detects the burst error based on the increase rate Δ2. In this case, however, it is difficult to transmit the target packets PCKT from the other information processing device 202 so as to coincide with time t2 of occurrence of the burst error, and it is difficult to reproduce the burst error by the retransmission of the packets PCKT. This is because the path through which the packets PCKT are transmitted changes according to the state of the six-dimensional mesh/torus network or the like in a case where a plurality of information processing devices 202 are coupled to the network, as illustrated in FIG. 5.

A burst error is caused by an external factor that is difficult to control, such as noise occurring in the transmission line, variations in voltage of a circuit generating a signal to be transmitted to the transmission line, or variations in ambient temperature of the circuit. It is therefore difficult to reproduce the burst error causing a link down by retransmission of the packets PCKT. For example, the parallel signal output by the DES illustrated in FIG. 3 to the receiving unit may include a large number of bit errors due to a temporary voltage variation or the like in a decision feedback equalizer (DFE), a clock data reproducing circuit, or the like coupled to the DES. When a burst error occurs due to bit errors caused by a temporary voltage variation, a temporary temperature variation, or the like, it is difficult to reproduce the burst error including the same bit errors.

Even in a case where the packets PCKT are repeatedly retransmitted to reproduce the burst error causing the link down, and a burst error occurs, there is no guarantee that the burst error has the same bit pattern (error pattern) of the burst error causing the link down. It is therefore difficult to identify the cause of the link down.

On the other hand, the information processing device 202 and the parallel processing device 102 including the receiving unit 60 illustrated in FIG. 4 may store the packets PCKT including errors at the time of occurrence of the burst error in the packet buffer 74. The receiving unit 60 may therefore reproduce the packets PCKT including the errors at the time of occurrence of the burst error without making the packets PCKT retransmitted from the other information processing device 202. The receiving unit 60 is included in each information processing device 202 of the parallel processing device 102. Thus, burst errors occurring in either or any of the information processing devices 202 may be reproduced in the case where packets PCKT are mutually transmitted and received between the information processing devices 202.

Figure 8:
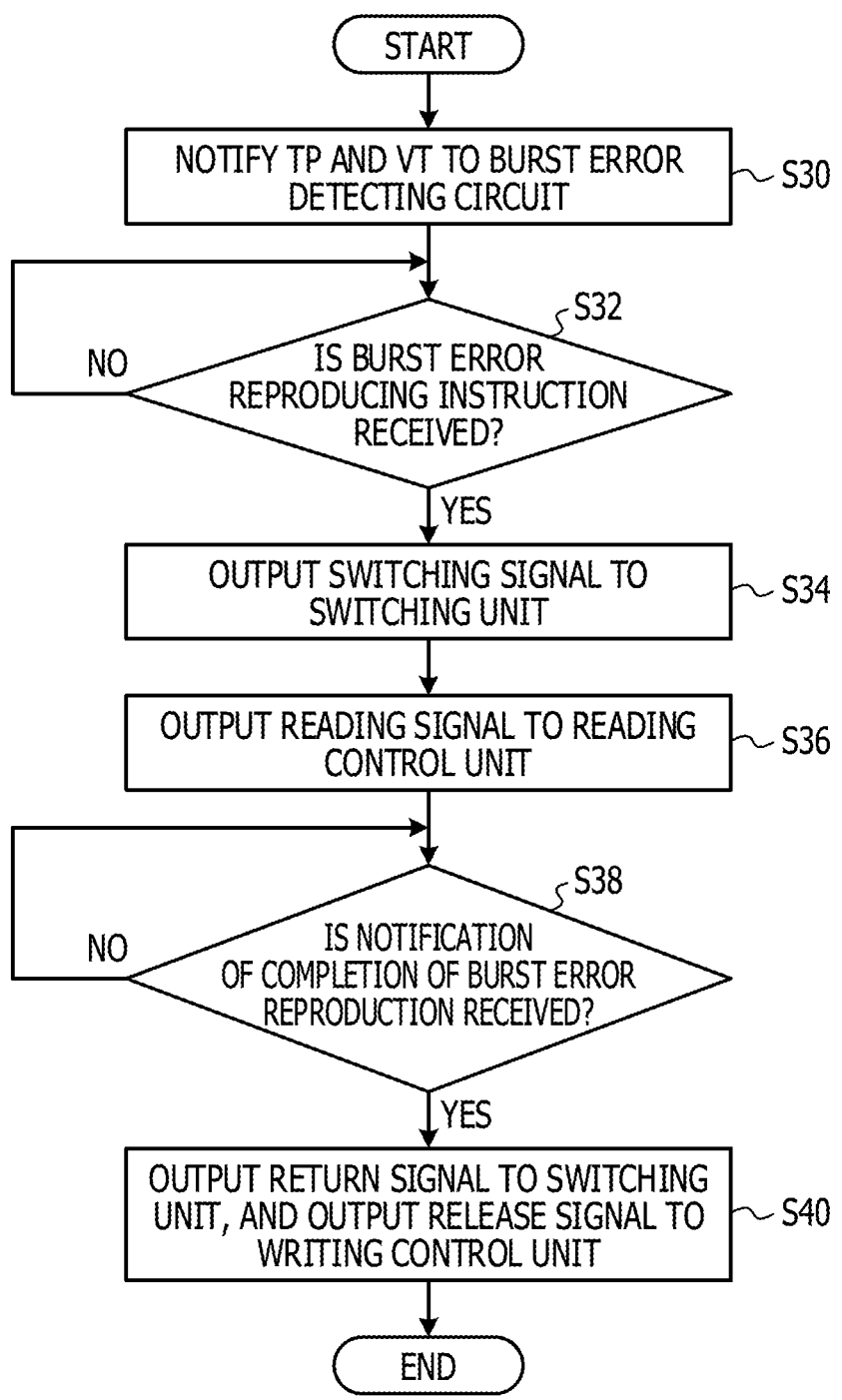
FIG. 8 illustrates an example of operation of a reproduction controller illustrated in FIG. 3.

FIG. 8 illustrates an example of operation of the reproduction controller illustrated in FIG. 3. In operation S30, the reproduction controller 40 writes the time interval TP and the threshold value VT to the register 69 of the burst error detecting unit 68 based on an instruction from the managing device or the like. Operation S30 may be omitted when the time interval TP and the threshold value VT are already written to the register 69.

In operation S32, the reproduction controller 40 waits until receiving an instruction to reproduce a burst error from the managing device or the like. When receiving the instruction, the reproduction controller 40 shifts the processing to operation S34. In operation S34, the reproduction controller 40 outputs a switching signal SW as one of reproducing instructions to the switching unit 62 to couple, to the internal transmission line 63, the path of transmission of packets PCKT output from the reading control unit 76.

In operation S36, the reproduction controller 40 outputs a reading signal RD as another reproducing instruction to the reading control unit 76 to make the reading control unit 76 read packets PCKT including errors at the time of occurrence of the burst error. After operation S36, the burst error is reproduced based on the packets PCKT read from the packet buffer 74 illustrated in FIG. 4, and a cause of a problem such as a link down or the like is analyzed.

In operation S38, the reproduction controller 40 waits until receiving a completion notification indicating completion of the reproduction of the burst error. When receiving the completion notification from the managing device or the like, the reproduction controller 40 shifts the processing to operation S40. In operation S40, the reproduction controller 40 outputs, to the switching unit 62, a return signal SW to resume transmitting packets PCKT from the other information processing device 202 to the internal transmission line 63. The reproduction controller 40 outputs a release signal WR to release the stopped state of writing the packets PCKT to the writing control unit 70, and thus makes the writing control unit 70 resume writing the packets PCKT to the packet buffer 74. The reproduction controller 40 then ends the processing. Either of the return signal SW and the release signal WR may be output first, or the return signal SW and the release signal WR may be output in parallel with each other. The reproduction controller 40 thereafter starts the processing in operation S30 or operation S32 based on an instruction from the managing device or the like.

When the reproduction controller 40 outputs the return signal SW to the switching unit 62, and outputs the release signal WR to the writing control unit 70, the writing of the packets PCKT received from the other information processing device 202 to the packet buffer 74 is resumed. Thus, a new burst error is detected in the receiving unit 60, and packets PCKT in which the new burst error occurs are retained in the packet buffer 74. For example, a burst error is detected repeatedly in the receiving unit 60 according to the switching signal SW, the reading signal RD, the return signal SW, and the release signal WR output by the reproduction controller 40.

Figure 9:
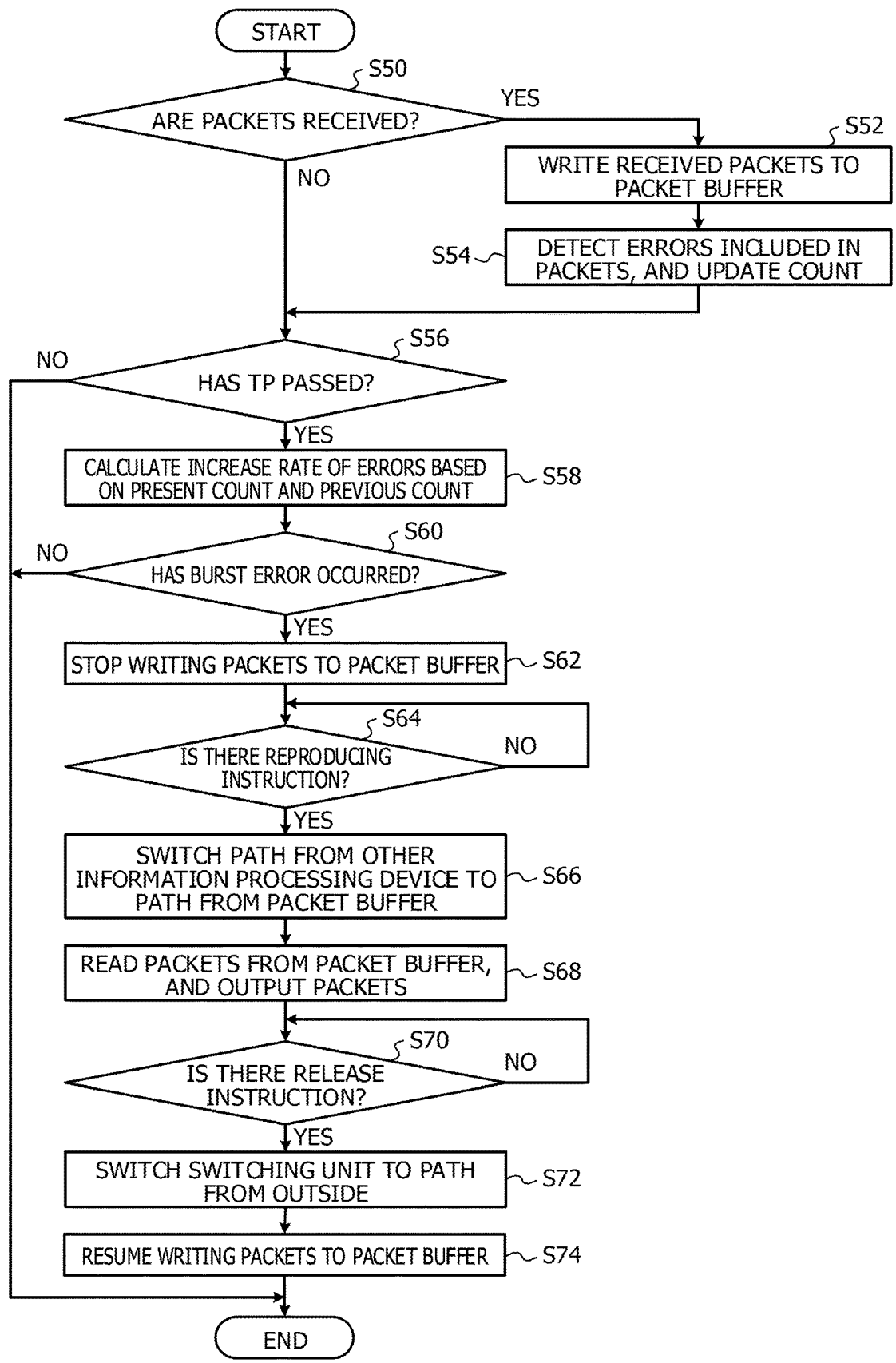
FIG. 9 illustrates an example of operation of the receiving unit illustrated in FIG. 4.

FIG. 9 illustrates an example of operation of the receiving unit illustrated in FIG. 4. For example, FIG. 9 illustrates an example of a burst error reproducing method that reproduces a burst error. A flow illustrated in FIG. 9 may be performed in a given cycle.

When the receiving unit 60 receives packets PCKT from the other information processing device 202 in operation S50, the receiving unit 60 shifts the processing to operation S52. When the receiving unit 60 does not receive packets PCKT from the other information processing device 202, the receiving unit 60 shifts the processing to operation S56. In operation S52, the writing control unit 70 writes the packets PCKT received from the other information processing device 202 via the switching unit 62 to the packet buffer 74.

In operation S54, the packet checking unit 64 detects errors included in the packets PCKT received from the other information processing device 202 via the switching unit 62, and outputs the error detection signal EDET each time the packet checking unit 64 detects an error. The error counter 66 updates the counter value COUNT each time the error counter 66 receives the error detection signal EDET.

When a time interval TP has passed in operation S56, the burst error detecting unit 68 shifts the processing to operation S58. When a time interval TP has not passed in operation S56, the burst error detecting unit 68 ends the processing. In operation S58, the burst error detecting unit 68 calculates the increase rate of the number of errors (counter value) based on a present counter value COUNT read from the error counter 66 and a previously read counter value COUNT. When the burst error detecting unit 68 detects a burst error based on the increase rate of the number of errors in operation S60, the burst error detecting unit 68 outputs the burst error detection signal BEDET. When a burst error is detected, the processing is shifted to operation S62. When no burst error is detected, the processing is ended. The processing of operations S56, S58, and S60 may be performed in parallel with the processing of operations S52 and S54.

In operation S62, the writing control unit 70 stops writing the packets PCKT to the packet buffer 74 based on the burst error detection signal BEDET. In operation S64, the switching unit 62 waits to receive the reproducing instruction (the switching signal SW and the reading signal RD) from the reproduction controller 40. When the switching unit 62 receives the reproducing instruction, the switching unit 62 shifts the processing to operation S66. In operation S66, based on the switching signal SW, the switching unit 62 shuts off the path through which the packets PCKT received from the other information processing device 202 are output to the internal transmission line 63. The switching unit 62 couples the path of the packets PCKT read from the packet buffer 74 to the internal transmission line 63. In operation S68, based on the reading signal RD from the reproduction controller 40, the reading control unit 76 reads the packets PCKT from the packet buffer 74, and outputs the read packets PCKT to the internal transmission line 63 via the switching unit 62.

In operation S70, the receiving unit 60 waits for the release instruction (the return signal SW and the writing signal WR) to release the stop of writing of the packets PCKT to the packet buffer 74. Based on a resuming instruction, the receiving unit 60 shifts the processing to operation S72. In operation S72, based on the return signal SW, the switching unit 62 shuts off the path through which the packets PCKT read from the packet buffer 74 are output to the internal transmission line 63. The switching unit 62 couples the path of the packets PCKT received from the other information processing device 202 to the internal transmission line 63. In operation S74, the writing control unit 70 resumes writing the packets PCKT to the packet buffer 74 based on the release signal WR. The processing is then ended. The processing of operations S72 and S74 may be performed in reverse order, or may be performed in parallel.

According to the return signal SW and the release signal WR, a new burst error is detected, and packets PCKT in which the new burst error occurs are stored in the packet buffer 74. Thus, even when a problem to which to direct attention such as a link down is not caused by a burst error, a burst error is detected repeatedly until a problem to which to direct attention occurs. As a result, packets PCKT causing a problem are retained in the packet buffer 74. Therefore, the packets PCKT in which a burst error as the cause of the problem occurs are reproduced without the packets PCKT being transmitted from the other information processing device 202.

As a result of the above, effects similar to effects in FIG. 1 may be obtained also in FIGS. 3 to 9. For example, packets PCKT including errors at the time of occurrence of a burst error are faithfully reproduced without the packets PCKT being retransmitted from the other information processing device 202. Because the packets PCKT including the errors at the time of occurrence of the burst error are stored in the packet buffer 74, the packets PCKT including the errors are reproduced any number of times.

Effects illustrated in the following may be obtained in FIGS. 3 to 9. For example, the reading control unit 76 writes, to the pointer register 72, an address AD indicating the storage position of an oldest packet PCKT among the packets PCKT to be read which packets are stored in the packet buffer 74. The reading control unit 76 accesses the packet buffer 74 based on the address AD written to the pointer register 72. The reading control unit 76 therefore reads the packets PCKT from the packet buffer 74 in the same order as the packets PCKT transmitted by the other information processing device 202. The packets PCKT transmitted by the other information processing device 202 are thus reproduced.

When the packets PCKT read from the packet buffer 74 are output from the reading control unit 76, the read packets PCKT are transmitted to the packet checking unit 64 in the same timings as the packets PCKT received from the other information processing device 202. According to the return signal SW and the release signal WR, even when a problem to which to direct attention such as a link down is not caused by a burst error, a burst error is detected repeatedly until a problem to which to direct attention occurs. According to the switching signal SW, the reading signal RD, the return signal SW, and the release signal WR output by the reproduction controller 40, the receiving unit 60 repeatedly detects a burst error.

Because the increase rate of the number of errors is calculated as a difference in the counter value COUNT, the circuit scale of the burst error detecting unit 68 is decreased as compared with a case where the increase rate is calculated by division. Because writing to the packet buffer 74 is stopped after the detection of a burst error, the circuit scale of the packet buffer 74 is decreased as compared with a case where the packets PCKT received before and after the detection of the burst error are written. The circuit scale of the receiving unit 60 may be reduced by decreasing the circuit scale of the burst error detecting unit 68 and the packet buffer 74.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
   a receiver configured to receive information from another information processing device; and
   a processor configured to process received information received by the receiver,
   the receiver:
   detects occurrence of a burst error in the received information;
   writes the received information in a first memory;
   stops the writing of the received information to the first memory based on detection of the burst error;
   shuts off transmission of the received information based on a reproducing instruction;
   reads the written information from the first memory; and
   transmits the read information, wherein
   the burst error is an error state in which the bit error rate exceeds a certain threshold.

2. The information processing device according to claim 1, wherein
   the receiver:
   reads the written information including the burst error from the first memory based on a first reproducing instruction of the reproducing instruction;
   shuts off transmission of the received information to an internal transmission line within the information processing device based on a second reproducing instruction of the reproducing instruction; and
   couples the read information to the internal transmission line.

3. The information processing device according to claim 2, wherein
   the receiver:
   stores, in a second memory, positional information indicating a position of a storage area storing oldest information in the first memory; and
   reads the written information in the first memory from the storage area indicated by the positional information stored in the second memory.

4. The information processing device according to claim 2, wherein
   a transmission rate at which the read information is output to the internal transmission line is equal to a transmission rate of the information from the another information processing device.

5. The information processing device according to claim 2, wherein
   the receiver:
   shuts off transmission of the read information to the internal transmission line and couples the path through which the received information from the another information processing device to the internal transmission line based on a return instruction; and
   releases a stopped state of writing the received information to the first memory based on a release instruction.

6. The information processing device according to claim 5, wherein
   the first reproducing instruction, the second reproducing instruction, the return instruction, or the release instruction is generated based on a request from a management device.

7. The information processing device according to claim 1, wherein
   the receiver:
   checks the received information from the another information processing device;
   outputs error detection information each time an error is detected;
   counts a number of outputs of the error detection information;
   reads a counter value at a first time interval,
   calculates an increase rate of the counter value; and
   detects the occurrence of the burst error when the calculated increase rate exceeds a first threshold value.

8. The information processing device according to claim 7, wherein
   the receiver:
   rewritably retains the first time interval and the first threshold value in a second memory; and
   detects the occurrence of the burst error based on the first time interval and the first threshold value, and
   the first memory has a storage capacity capable of writing the received information from the another information processing device within a maximum first time interval that is settable in the second memory.

9. The information processing device according to claim 1, wherein
   the receiver:
   receives the received information from the another information processing device as packets; and
   sequentially writes the received packets to the first memory.

10. A burst error producing method comprising:
    receiving information from another information processing device; and
    detecting, by a computer, occurrence of a burst error in the received information;
    writing the received information in a first memory;
    stopping the writing of the received information to the first memory based on detection of the burst error;
    shutting off transmission of the received information based on a reproducing instruction;
    reading the written information from the first memory; and
    transmitting the read information, wherein
    the burst error is an error state in which the bit error rate exceeds a certain threshold.

11. The burst error producing method according to claim 10, further comprising:
    reading the written information including the burst error from the first memory based on a first reproducing instruction of the reproducing instruction;

shutting off transmission of the received information to an internal transmission line within the information processing device based on a second reproducing instruction of the reproducing instruction; and coupling the read information to the internal transmission line.

12. The burst error producing method according to claim 11, further comprising:

storing, in a second memory, positional information indicating a position of a storage area storing oldest information in the first memory; and reading the written information in the first memory from the storage area indicated by the positional information stored in the second memory.

13. The burst error producing method according to claim 11, wherein a transmission rate at which the read information is output to the internal transmission line is equal to a transmission rate of the information from the another information processing device.

14. The burst error producing method according to claim 11, further comprising:

shutting off transmission of the read information to the internal transmission line and couples the path through which the received information from the another information processing device to the internal transmission line based on a return instruction; and releasing a stopped state of writing the received information to the first memory based on a release instruction.

15. The burst error producing method according to claim 14, wherein the first reproducing instruction, the second reproducing instruction, the return instruction, or the release instruction is generated based on a request from a management device.

16. The burst error producing method according to claim 10, further comprising:

checking the received information from the another information processing device;

outputting error detection information each time an error is detected;

counting a number of outputs of the error detection information;

reading a counter value at a first time interval, calculating an increase rate of the counter value; and detecting the occurrence of the burst error when the calculated increase rate exceeds a first threshold value.

17. The burst error producing method according to claim 16, further comprising:

rewritably retaining the first time interval and the first threshold value in a second memory; and detecting the occurrence of the burst error based on the first time interval and the first threshold value, and the first memory has a storage capacity capable of writing the received information from the another information processing device within a maximum first time interval that is settable in the second memory.

18. The burst error producing method according to claim 10, further comprising:

receiving the received information from the another information processing device as packets; and sequentially writing the received packets to the first memory.

* * * * *